United States Patent
Fay, II

(10) Patent No.: US 11,006,571 B2
(45) Date of Patent: May 18, 2021

(54) FLOATATION SPRINGS ATTACHED TO ADJUSTABLE SKID SHOES

(71) Applicant: CNH Industrial America LLC, New Holland, PA (US)

(72) Inventor: Jeffrey Brown Fay, II, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 154 days.

(21) Appl. No.: 16/407,279

(22) Filed: May 9, 2019

(65) Prior Publication Data
US 2020/0352093 A1    Nov. 12, 2020

(51) Int. Cl.
*A01D 34/28*    (2006.01)
*A01B 63/04*    (2006.01)
*A01B 63/00*    (2006.01)

(52) U.S. Cl.
CPC ............ *A01D 34/28* (2013.01); *A01B 63/008* (2013.01); *A01B 63/045* (2013.01); *A01D 34/283* (2013.01)

(58) Field of Classification Search
None
See application file for complete search history.

(56) References Cited

U.S. PATENT DOCUMENTS

| | | | | |
|---|---|---|---|---|
| 2,652,672 A * | 9/1953 | Love | .................... | A01B 63/32 172/390 |
| 2,750,727 A * | 6/1956 | Wright | ................ | A01D 41/141 56/208 |
| 2,875,568 A * | 3/1959 | Watamaker | ............ | A01D 45/00 56/210 |
| 3,168,800 A | 2/1965 | Dyrdahl | | |
| 3,238,709 A * | 3/1966 | Williams | ............... | A01D 41/14 56/208 |
| 3,313,095 A * | 4/1967 | Gaterman | ............. | A01D 34/14 56/312 |
| 3,589,116 A * | 6/1971 | Speiser | ................ | A01D 75/306 56/249 |
| 3,599,406 A | 8/1971 | Akgulian et al. | | |
| 3,611,681 A * | 10/1971 | Blanton et al. | ........ | A01D 41/14 56/10.4 |
| 3,747,311 A * | 7/1973 | DeCoene | ............ | A01D 41/141 56/208 |

(Continued)

FOREIGN PATENT DOCUMENTS

| | | |
|---|---|---|
| DE | 1185410 B | 1/1965 |
| EP | 2436256 A1 | 4/2012 |

(Continued)

*Primary Examiner* — Thomas B Will
*Assistant Examiner* — Madeline Ivy Runco
(74) *Attorney, Agent, or Firm* — Peter K. Zacharias; Patrick M. Sheldrake

(57) ABSTRACT

A header floatation system that includes a header, a floatation mechanism which includes a first end and a second end opposite the first end, an adjustment array which includes at least a first contact point, a bracket which includes at least a second contact point, a skid shoe, and a fastener. The first end of the floatation mechanism can be mechanically linked to the adjustment array. Either the adjustment array or the bracket can include a third contact point. The adjustment array can be mechanically linked to the skid shoe. The fastener can be positioned adjacent to, on, or through at least the first or second contact points aligning contact between the bracket and the adjustment array.

20 Claims, 9 Drawing Sheets

(56) References Cited

U.S. PATENT DOCUMENTS

| | | | | |
|---|---|---|---|---|
| 3,760,882 A | * | 9/1973 | Geurts | F16B 2/18 |
| | | | | 172/260.5 |
| 3,886,718 A | * | 6/1975 | Talbot | A01D 41/141 |
| | | | | 56/208 |
| 4,085,571 A | | 4/1978 | Mortier et al. | |
| 4,177,627 A | * | 12/1979 | Cicci | A01D 43/107 |
| | | | | 56/15.8 |
| 4,206,582 A | | 6/1980 | Molzahn et al. | |
| 4,206,584 A | * | 6/1980 | Johnson | A01D 41/14 |
| | | | | 56/15.8 |
| 4,776,153 A | * | 10/1988 | DePauw | A01D 41/145 |
| | | | | 56/10.2 E |
| 5,327,709 A | | 7/1994 | Webb | |
| 6,244,027 B1 | | 6/2001 | McClure et al. | |
| 6,289,659 B1 | * | 9/2001 | Fox | A01D 46/08 |
| | | | | 56/10.2 E |
| 8,910,724 B2 | * | 12/2014 | Borgmann | B23P 11/00 |
| | | | | 171/124 |
| 9,131,638 B2 | * | 9/2015 | Fay, II | A01D 34/001 |
| 9,775,291 B2 | * | 10/2017 | Neudorf | A01D 41/14 |
| 9,861,036 B2 | * | 1/2018 | Totten | A01D 43/107 |
| 9,930,822 B2 | * | 4/2018 | Hagny | A01B 15/16 |
| 2006/0242935 A1 | * | 11/2006 | Rayfield | A01D 41/141 |
| | | | | 56/10.2 E |
| 2010/0083629 A1 | * | 4/2010 | Klotzbach | A01D 41/14 |
| | | | | 56/320.1 |
| 2016/0014963 A1 | | 1/2016 | Totten et al. | |
| 2017/0079190 A1 | * | 3/2017 | Steinlage | A01B 19/04 |
| 2018/0338412 A1 | * | 11/2018 | Jagow | A01B 63/24 |

FOREIGN PATENT DOCUMENTS

| | | |
|---|---|---|
| GB | 1374702 A | 11/1974 |
| GB | 773378 A | 4/1995 |

\* cited by examiner

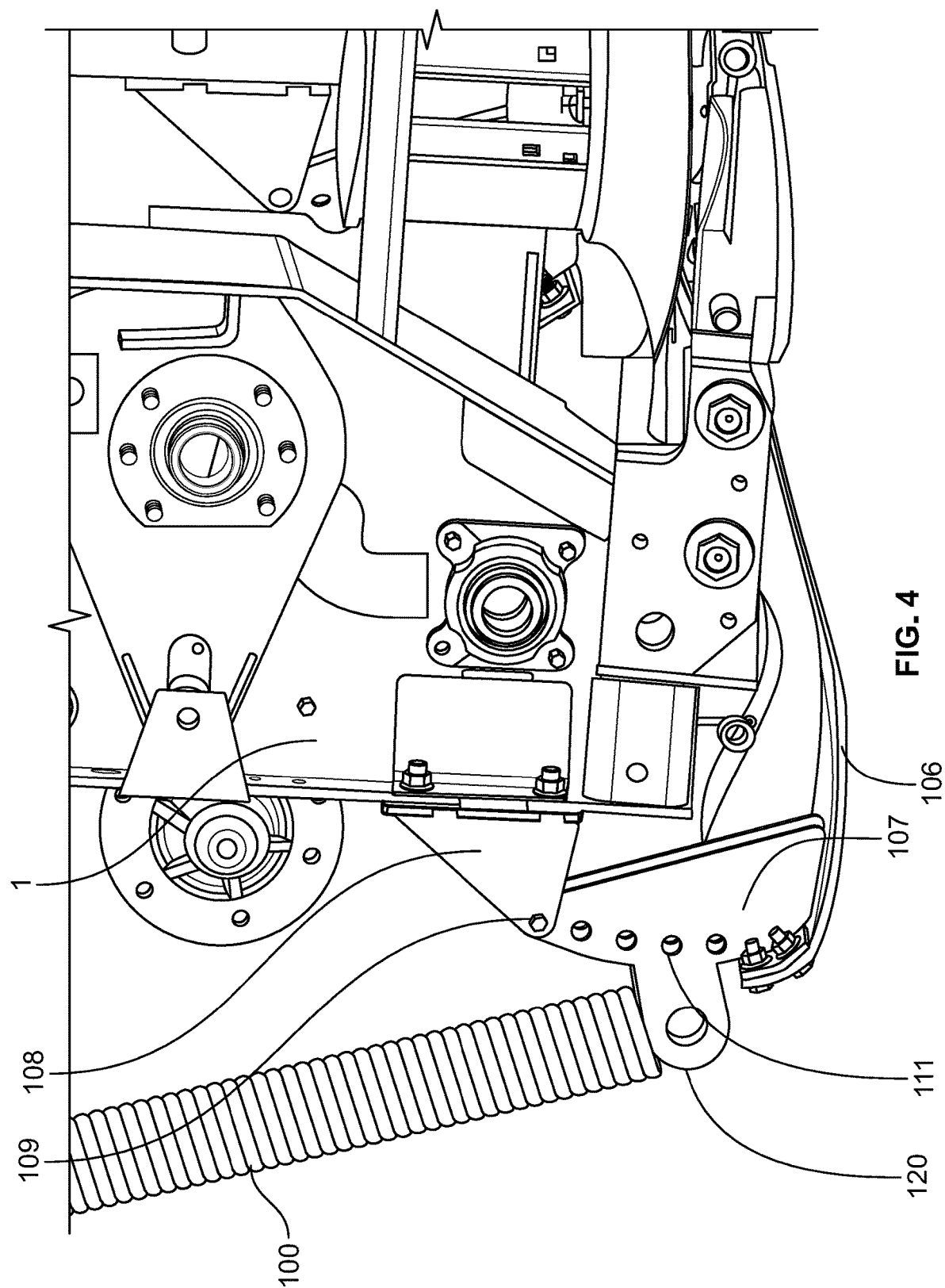

US 11,006,571 B2

FLOATATION SPRINGS ATTACHED TO ADJUSTABLE SKID SHOES

FIELD OF INVENTION

The present invention relates to a header floatation system and a system for using the header floatation system. The header floatation system comprises a skid shoe, an adjustment array, a bracket, a fastener, and a floatation mechanism. The present invention relates to a header floatation system capable of being used on an agricultural mower.

BACKGROUND

For many years agricultural mowers have featured adjustable skid shoe systems. These mowers are typically attached to and pulled behind an agricultural vehicle, such as a tractor. The adjustable skid shoe systems allow an operator to make adjustments to the cut height by adjusting the skid shoes which are typically connected to the bottom surface of the cutter bar.

For example, when such a skid shoe is adjusted down, the cutter bar height rises, which in turn reduces the elongation of the floatation springs. This elongation reduces the floatation force that the floatation springs apply to the cutter bar, thus increasing the ground force on the cutter bar. This problem is exacerbated by the design of most modern adjustable skid shoes, which tend to have a much smaller ground contact area than traditional skid shoes, which tended to be mounted over nearly the entirety of the bottom of the cutter bar.

Adjusting the floatation of the cutter bar to correspond with a change in cutter bar height can be complicated and require costly tools and mechanisms. An operator is unable to manually adjust traditional floatation mechanisms without tools to achieve a suitable floatation force for an adjusted cutter bar. Floatation adjustment is required, however, because traditional floatation mechanisms are connected to the cutter bar at one end and the fame of the header at the other.

SUMMARY

An aspect of the present disclosure is a header floatation system. The header floatation system includes a header comprising a cutter bar positioned generally at the underside of the header, a floatation mechanism, a bracket, a skid shoe, and a fastener. The floatation mechanism includes a first end and a second end which is opposite the first end. The adjustment array includes at least a first contact point. The bracket includes at least a second contact point. The first end of the floatation mechanism is mechanically linked to the adjustment array. Either the adjustment array or the bracket includes a third contact point. The adjustment array is mechanically linked to the skid shoe. The fastener is positioned adjacent to, on, or through at least the first or second contact point aligning contact between the bracket and the adjustment array.

In some embodiments, the adjustment array includes a plurality of contact points. The contact points are holes. The contact points are arranged in a path. Each contact point along the path defines a distinct cut height and a distinct operable mode.

In some embodiments, the header floatation system includes a trail frame and an apron positioned substantially horizontally across the top of the trail frame. The floatation mechanism includes a spring positioned vertically or substantially vertically from the adjustment array to the apron and defining a cylindrical space. The floatation mechanism also include a bar positioned vertically or substantially vertically from the adjustment array to the apron and sharing or substantially sharing an axis with the cylindrical space defined by the spring. The spring is adjustable in position and creates tension upon the bar by attachment to the bar.

In some embodiments, the header floatation system is adjustable in cut height in at least a first and second operable mode. In the first operable mode, the adjustment array and the bracket are positionally aligned by the fastener operably linking the adjustment array and the bracket at the first contact point. In the second operable mode, the adjustment array and the bracket are positionally aligned by the fastener operably linking the adjustment array and the bracket at the third contact point.

In some embodiments, the floatation mechanism is free or substantially free of tension when the header is lifted above the second cut height.

In some embodiments, the header floatation system further includes a third operable mode. The third operable mode includes the header at a height where the floatation mechanism is free or substantially free of tension.

In some embodiments, the floatation mechanism has a stretch length while the header is positioned at the first cut height that is substantially equal to the stretch length while the header is positioned at the second cut height.

In some embodiments, the adjustment array includes a first array side and a second array side. The first array side includes a first plurality of contact points that are a plurality of holes in a path corresponding to positions that determine a cut height of the header upon alignment with the second contact point on the bracket. The second array side includes a second plurality of contact points. Each of the holes in the second plurality of contact points is a pair with one of the holes in the first plurality of contact points. Each pair of contact points has the same vertical placement on the first and the second array sides. The bracket includes a first bracket side and a second bracket side. The adjustment array is positioned between the first and the second bracket sides.

In some embodiments, the floatation mechanism is mechanically linked to the adjustment array at approximately a vertical middle of the adjustment array.

In some embodiments, the adjustment array comprises two to eight contact points.

Another aspect of the present disclosure is a mower including a tongue and a header floatation system. The header floatation system includes a trail frame, a header including a cutter bar located generally on the underside of the header, a skid shoe, an adjustment array, a floatation mechanism, a bracket, and a fastener. The adjustment array includes at least a first contact point. The floatation mechanism is mechanically linked to the adjustment array at one end of the floatation mechanism and mechanically linked to the trail frame at an opposite end of the floatation mechanism. The bracket is mechanically linked to the header and includes at least a second contact point. The trail frame and the header are mechanically linked by at least one pivot point. The adjustment array is mechanically linked to the skid shoe. Either the adjustment array or the bracket include at least a third contact point. The fastener is positioned adjacent to, on, or through at least the first and second contact point aligning contact between the bracket and the adjustment array.

In some embodiments, the adjustment array includes a plurality of contact points. The contact points are holes. The contact points are arranged in a path corresponding to positions that determine a cut height of the header.

In some embodiments, the mower includes an apron positioned substantially horizontally across the top of the trail frame. The floatation mechanism includes a spring positioned vertically or substantially vertically from the adjustment array to the apron and defining a cylindrical space. The floatation mechanism also include a bar positioned vertically or substantially vertically from the adjustment array to the apron and sharing or substantially sharing an axis with the cylindrical space defined by the spring. The spring is adjustable in position and creates tension upon the bar by attachment to the bar.

In some embodiments, the cutter bar is adjustable in cut height in at least a first and a second operable mode. In the first operable mode, the adjustment array and the bracket are positionally aligned by the fastener operably linking the adjustment array and the bracket at the first contact point. In the second operable mode, the adjustment array and the bracket are positionally aligned by the fastener operably linking the adjustment array and the bracket at the third contact point.

In some embodiments, the floatation mechanism is free or substantially free of tension when the cutter bar is lifted above the second cut height.

In some embodiments, the mower further includes a third operable mode. The third operable mode includes the cutter bar being positioned at a height where the floatation mechanism is free or substantially free of tension.

In some embodiments, the floatation mechanism has a stretch length while the cutter bar is positioned at the first cut height that is approximately equal to the stretch length while the cutter bar is positioned at the second cut height.

In some embodiments, the adjustment array includes a first array side and a second array side. The first array side includes a first plurality of contact points that are a plurality of holes in a path corresponding to positions that determine a cut height of the header upon alignment with the second contact point on the bracket. The second array side includes a second plurality of contact points. The each of the holes in the second plurality of contact points is a pair with one of the holes in the first plurality of contact points. Each pair of contact points has the same vertical placement on the first and second array sides. The bracket includes a first bracket side and a second bracket side. The adjustment array is positioned between the first and second bracket sides.

In some embodiments, the skid shoe is mechanically linked to the cutter bar by at least one pivot point.

In some embodiments, the floatation mechanism is connected to the adjustment array at about a vertical middle of the adjustment array.

Another aspect of the present disclosure is a method of adjusting the height of a header. The method includes providing a header floatation system. The header floatation system includes a trail frame, a header including a cutter bar generally positioned on the underside of the header, a skid shoe, an adjustment array, a floatation mechanism, a bracket, and a fastener. The adjustment array includes at least a first contact point. The floatation mechanism is mechanically linked to the adjustment array at one end of the floatation mechanism and mechanically linked to the trail frame at an opposite end of the floatation mechanism. The bracket is mechanically linked to the header and includes at least a second contact point. The trail frame and the header are mechanically linked by at least one pivot point. Either the adjustment array or the bracket include at least a third contact point. The fastener is positioned adjacent to, on, or through at least the first or the second contact points aligning contact between the bracket and the adjustment array. The method further includes positioning the fastener adjacent to, on, or through at least the first or the second contact point aligning contact between the bracket and the adjustment array to position the cutter bar to a desired cut height.

In some embodiments, the method further includes lifting the header to a height that corresponds to the spring being free or substantially free of tension before positioning the fastener.

BRIEF DESCRIPTION OF DRAWINGS

To assist those of skill in the art in making and using the disclosed header and associated system and methods, reference is made to the accompanying figures, wherein:

FIG. 4 is a side view of an exemplary adjustable skid shoe mechanically linked to an attached exemplary floatation mechanism.

DETAILED DESCRIPTION

Figure 1:
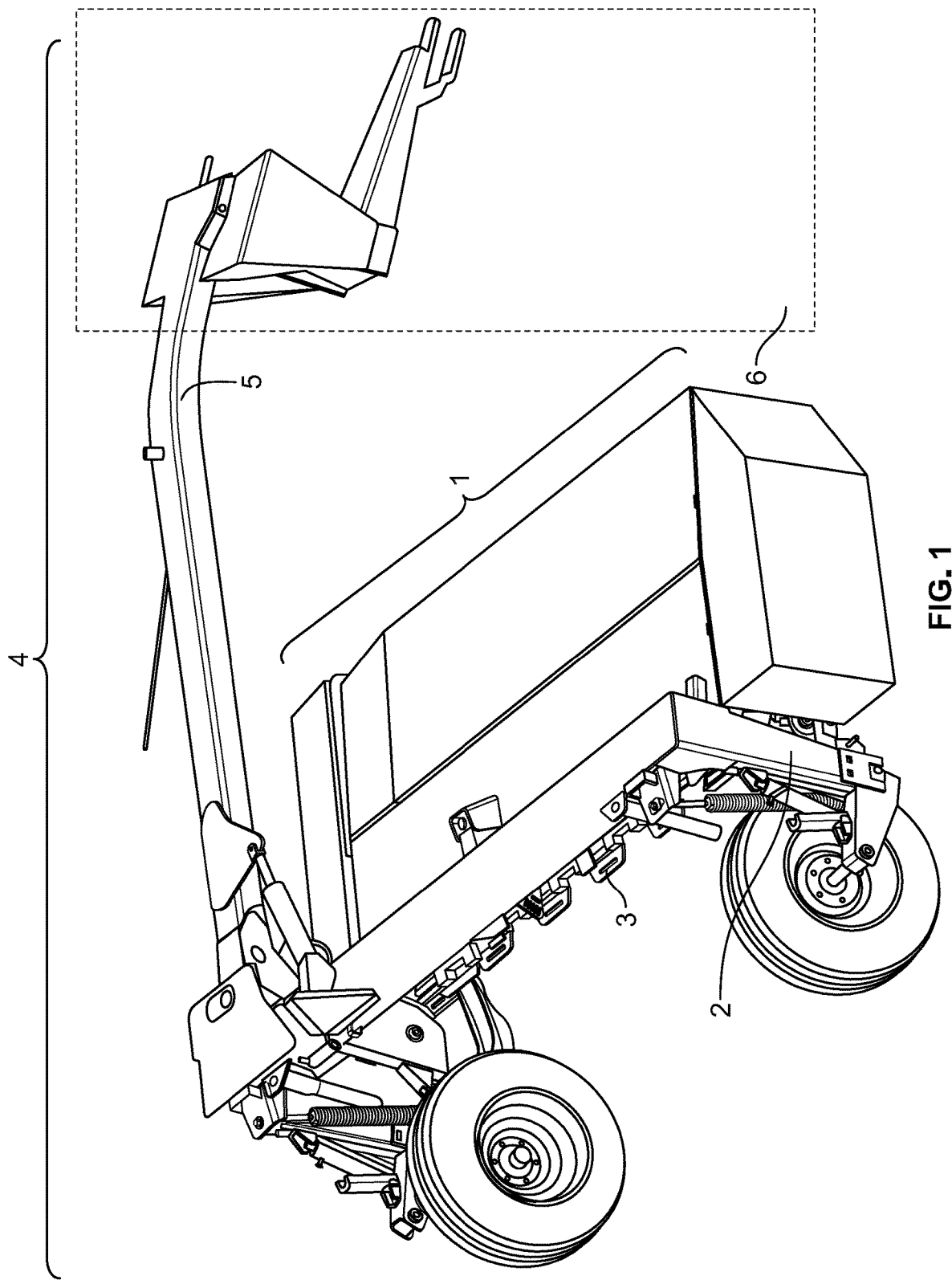
FIG. 1 is a perspective view of an exemplary mower of the present disclosure attached to a tractor.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g., 3, 4, or 5.

The term "plurality" as used herein is defined as any amount or number greater or more than 1. In some embodiments, the term "plurality" means 2, 3, 4, 5, 6 or more.

The terms "left", "right", "top", or "bottom" are used herein as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes.

The term "about" or "approximately" as used herein when referring to a measurable value such as an amount, a temporal duration, and the like, is meant to encompass variations of ±20%, ±10%, ±5%, ±1%, ±0.5%, ±0.4%, ±0.3%, ±0.2%, ±0.1%, ±0.09%, ±0.08%, ±0.07%, ±0.06%, ±0.05%, ±0.04%, ±0.03%, ±0.02% or ±0.01% from the specified value, as such variations are appropriate to perform the disclosed methods.

The term "substantially equal" as used herein when referring to a measureable and/or adjustable value is meant to encompass a value equal to or approximately equal to a set value or range. For example, the value can be equal to or within ±5%, ±1%, ±0.5%, ±0.4%, ±0.3%, ±0.2%, ±0.1%, ±0.09%, ±0.08%, ±0.07%, ±0.06%, ±0.05%, ±0.04%, ±0.03%, ±0.02% or ±0.01% of a set desired value or an expected value.

The term "connect", "connects", "connected", or "connecting" as used herein is meant to encompass both direct connections and indirect connections.

The terms "operably connected" and "mechanically linked" as used herein are interchangeable are refer to both direct connections and indirect connections.

The terms "mount" and "apron" as used herein are not meant to be limited to any specific geometry. An apron may be used as a mount and a mount may be used as an apron.

The term "tractor" as used herein is a general term for vehicles that may be used in agricultural applications or to otherwise carry or be operably connected to equipment, including but not limited to harvesters.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Furthermore, the various components shown or described herein for any specific application of this invention can be varied and the practice of a specific application of any element may already be widely known or used in the art by persons skilled in the art and each will likewise not therefore be discussed in significant detail.

FIG. 1 is a perspective view of a mower 4 attached to a tractor 6. The mower includes a header floatation system and a tongue 5. The header floatation system includes a header 1, a trail frame 2, and a cutter bar 3. The tongue 5 extends forwardly from the trail frame 2 and connects the mower 4 to the tractor 6. In some embodiments, the tongue 5 can be pivotally connected to the trail frame 2. In some embodiments, the header 1 can be pivotally connected to the trail frame 2. The cutter bar 3 is generally positioned on the underside of the header 1.

Figure 2:
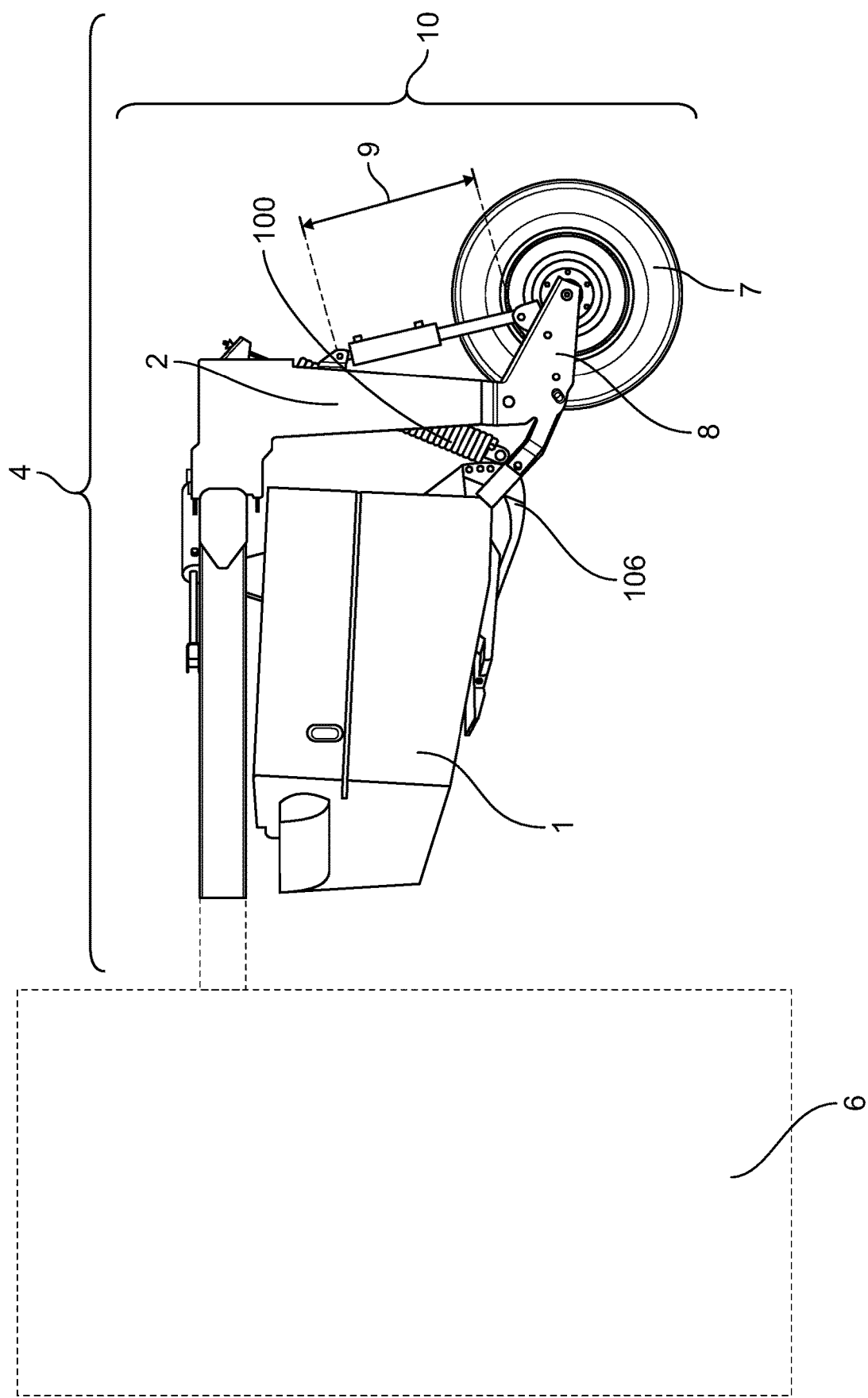
FIG. 2 is a side view of an exemplary header floatation system including an exemplary header and an exemplary adjustable skid shoe mechanically linked to an attached exemplary floatation mechanism.

FIG. 2 is a side view of a mower 4 attached to a tractor 6. The mower 4 includes a header floatation system 10. The header floatation system 10 includes an adjustable skid shoe 106 which is mechanically linked to a floatation mechanism 100. The adjustable skid shoe 106 is positioned below the cutter bar 3. In some embodiments, the skid shoe 106 can be pivotally connected to the cutter bar 3. In some embodiments, the mower 4 can include a wheel 7. In some embodiments, the wheel 7 can be connected to the trail frame 2 by a wheel mount 8. In some embodiments the wheel mount 8 can be pivotally connected to the trail frame 2. In some embodiments, a suspension cylinder 9 may be connected to the trail frame 2 at one end, such as its top end, and the wheel mount 8 at a second end, such as its bottom end.

Figure 3:
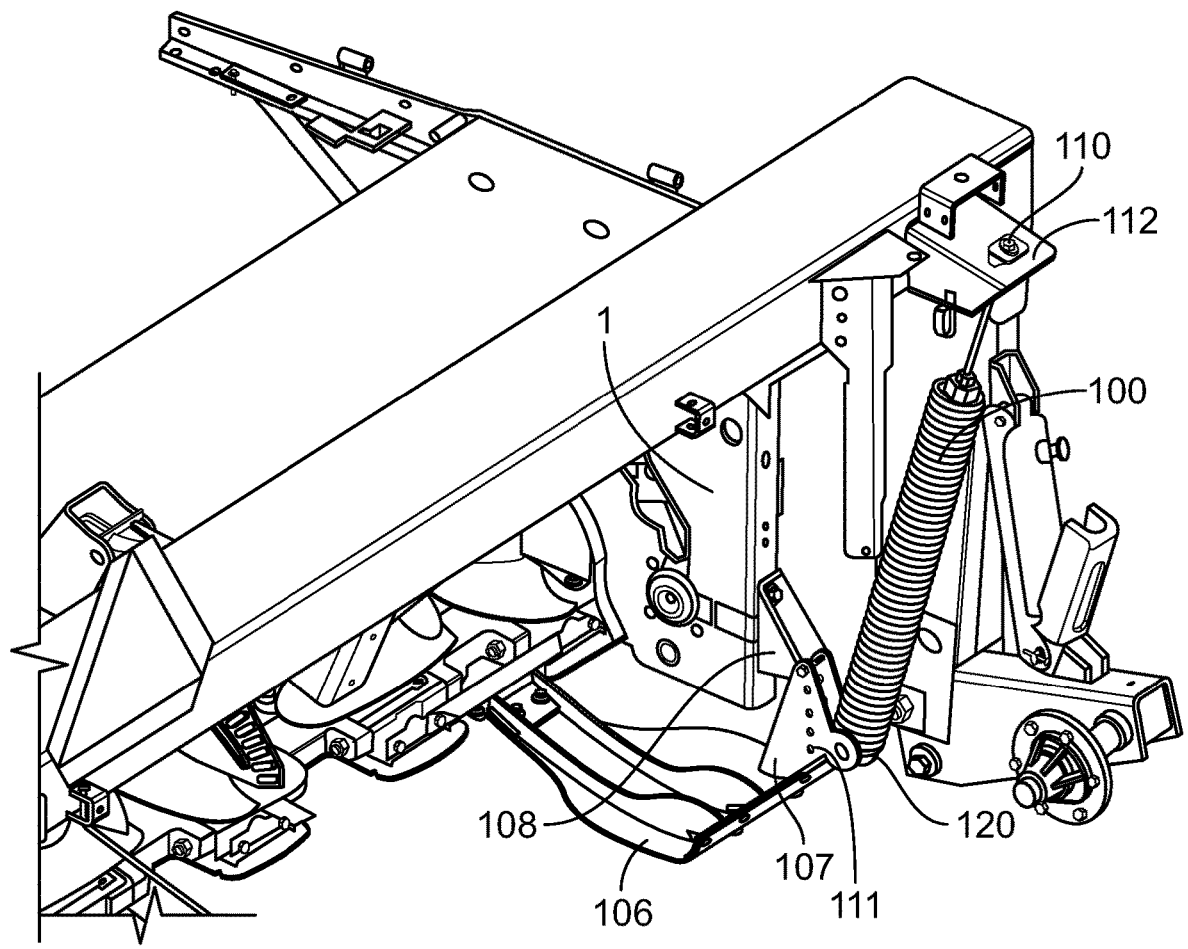
FIG. 3 is a perspective view of an exemplary header floatation system including an exemplary header and an exemplary adjustable skid shoe mechanically linked to an attached exemplary floatation mechanism.

FIG. 3 is a perspective view of a header floatation system including an adjustable skid shoe 106 mechanically linked to a floatation mechanism 100. The skid shoe 106 is mechanically linked to an adjustment array 107. The adjustment array includes at least one contact point 111. In some embodiments, the adjustment array 107 can include a plurality of contact points 111. In some embodiments, the contact points 111 can be holes. A bracket 108 is mechanically linked to the header 1. The bracket 108 includes a contact point 111. In some embodiments, the bracket 108 can include a plurality of contact points 111. In some embodiments, the contact points 111 can be holes. The floatation mechanism 100 is mechanically linked to the adjustment array 107 at connection point 120. In some embodiments, the floatation mechanism 100 can be a spring of any type, such as, for example, a coil spring, a torsion spring, an air spring, or a hydraulic accumulator. In some embodiments, the connection point 120 can be positioned at approximately the vertical middle of the adjustment array 107.

In some embodiments, the adjustment array 107 can include two array walls where the contact points 111 on the array walls are positioned in a way that they correspond to the contact points on the other wall and may be aligned with the bracket 108 through the use of fastener 109 to correspond to desired cut heights.

FIG. 4 is a side view of the skid shoe 106 while a fastener 109 is aligning contact between contact points 111 the adjustment array 107 and the bracket 108. The fastener 109 can be used to align contact between various contact points 111. In some embodiments, the fastener 109 may be positioned adjacent to contact points 111 to align contact between the bracket 108 and the adjustment array 107. In some embodiments, the fastener 109 may be positioned on contact points 111 to align contact between the bracket 108 and the adjustment array 107. In some embodiments, the fastener 109 may be positioned through contact points 111 to align contact between the bracket 108 and the adjustment array 107. In some embodiments, the fastener 109 can be a pin. In embodiments where the adjustment array 107 includes a plurality of contact points 111, the distance between the cutter bar 3 and the ground, sometimes referred to as the cut height, is dependent on which contact point 111 on the adjustment array 107 is aligned with a contact point 111 on the bracket 108. In embodiments where the bracket 108 includes a plurality of contact points 111, the cut height is dependent on which contact point 111 on the bracket 108 is aligned with a contact point 111 on the adjustment array 107. As the header 1 is mechanically linked to the cutter bar 3, it may also be said that the distance between the bottom of the header 1, which is the same point as the bottom of the cutter bar 3, and the ground is the cut height.

Figure 5A:
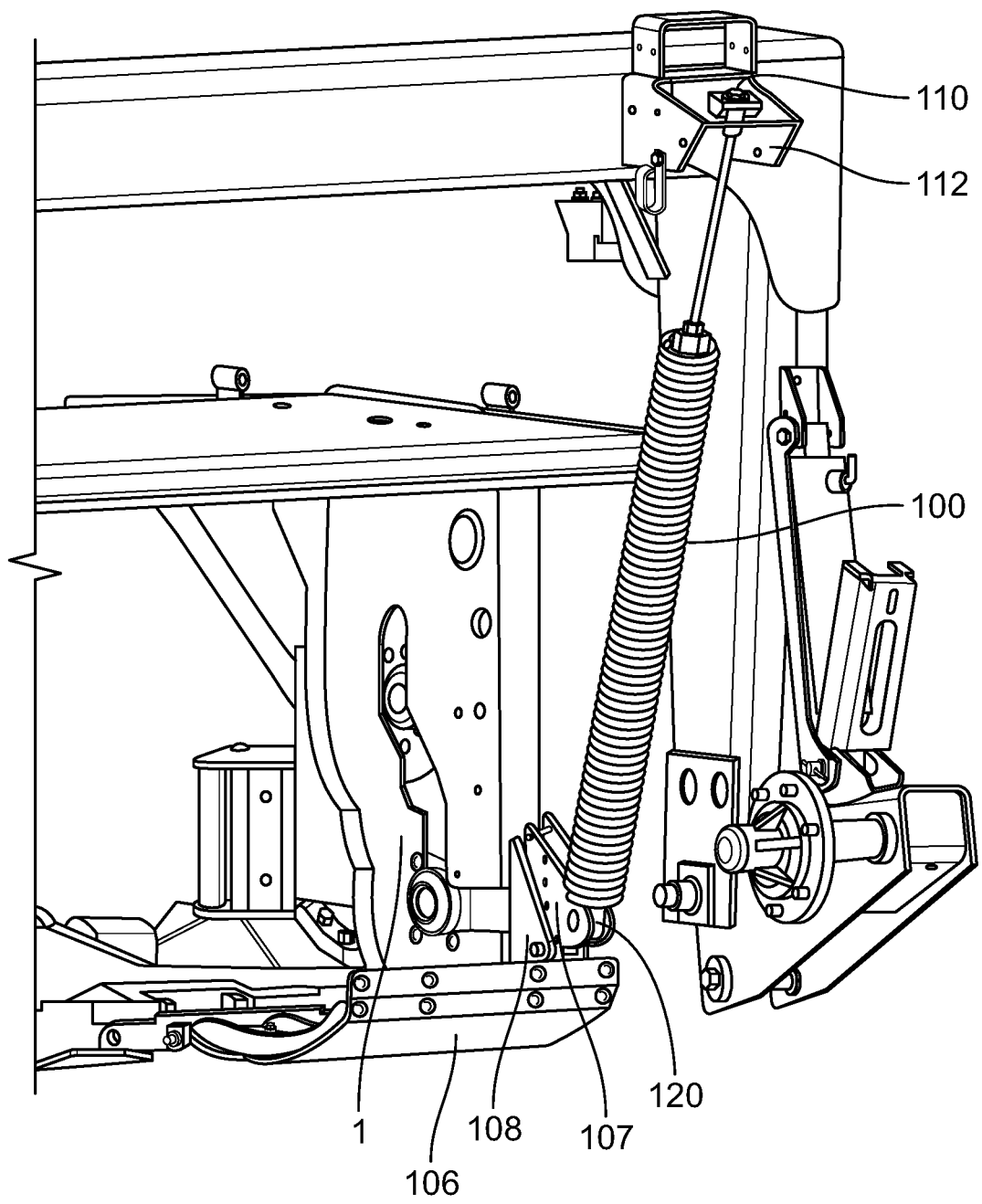
FIG. 5A is a perspective view of an exemplary header including an exemplary adjustable skid shoe mechanically linked to an attached exemplary floatation mechanism while the header is set to a minimum cut height.
Figure 5B:
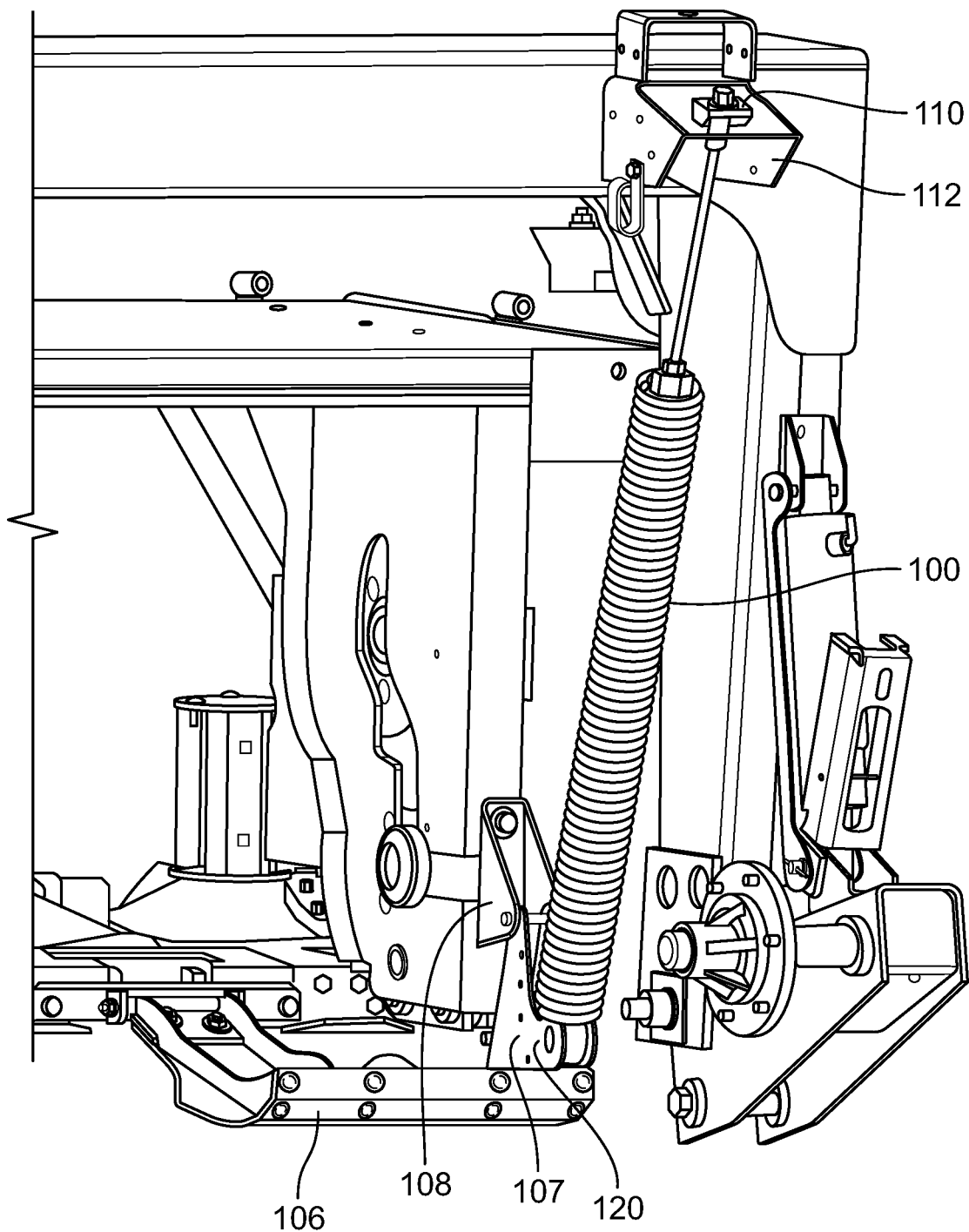
FIG. 5B is a perspective view of an exemplary header including an exemplary adjustable skid shoe mechanically linked to an attached exemplary floatation mechanism while the header is set to a maximum cut height.
Figure 6A:
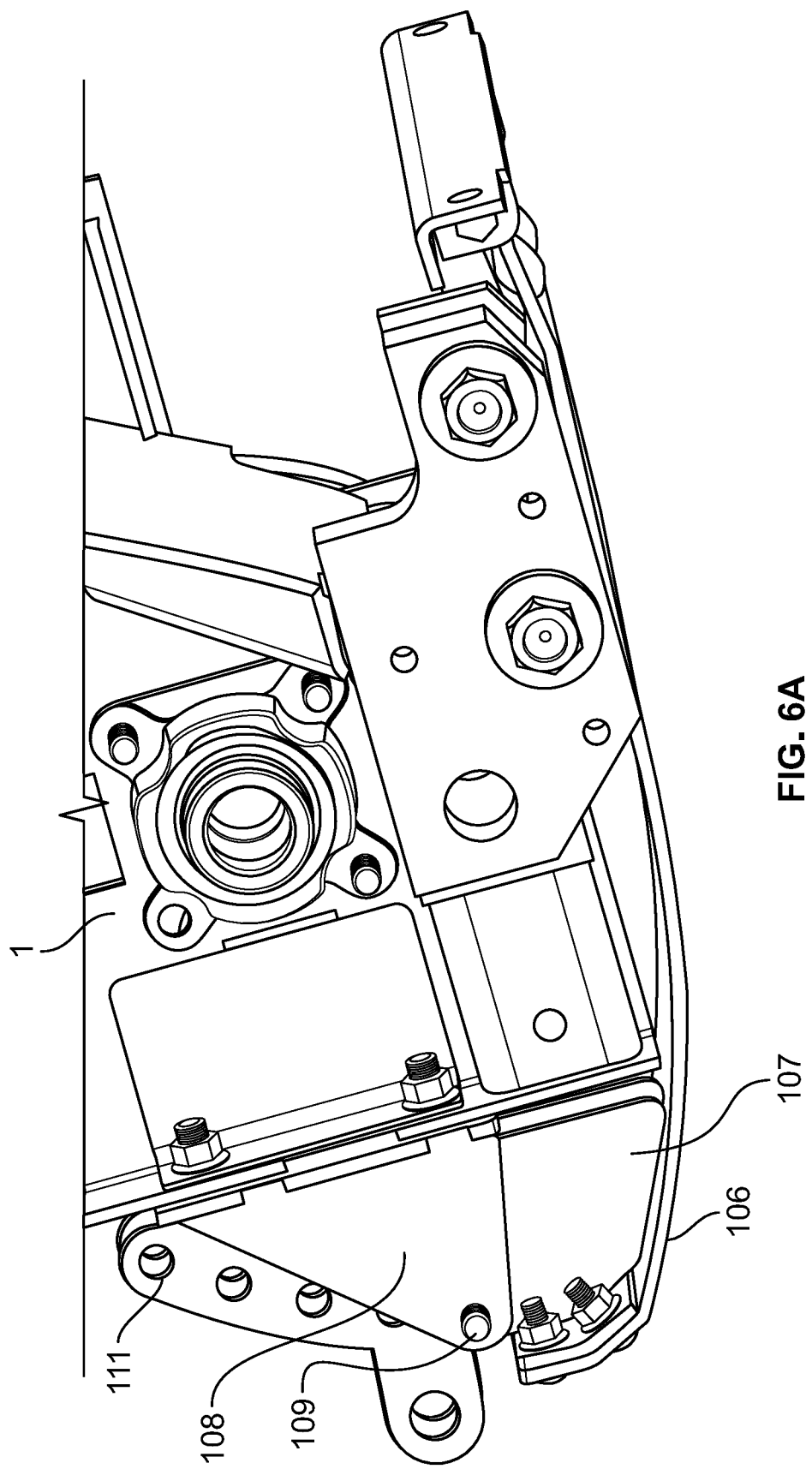
FIG. 6A is a side view of an exemplary adjustable skid shoe mechanically linked to an attached exemplary floatation mechanism while the header is set to a minimum cut height.

FIG. 5A and FIG. 5B are perspective views of the header floatation system 10 while the skid shoe 106 and the header 1 are positioned in such a way to achieve minimum and maximum cut height, respectively. FIG. 5A shows the fastener 109 aligning contact between the bottommost contact point 111 of the adjustment array 107 and the contact point 111 on the bracket 108. The skid shoe 106 is always in contact with the ground. This means that such an alignment of contact points 111 as seen in FIG. 6A will cause the header 1 or cutter bar 3 to be positioned at the minimum cut height. FIG. 5B shows the fastener 109 aligning contact between the uppermost contact point 111 of the adjustment array 107 and the contact point 111 on the bracket 108. Due to the skid shoe's 106 contact with the ground, this will cause the header 1 or cutter bar 3 to be positioned at the maximum cut height.

Due to the skid shoe 106 being in approximately constant contact with the ground, the distance between the skid shoe 106 and the top of the trail frame 2 is approximately constant. In some embodiments, this means that the distance between the skid shoe 106 and the apron 112 are approximately constant. Further, because the floatation mechanism 100 is mechanically linked to the skid shoe 106, the length of the floatation mechanism 100, also known as the stretch length, remains approximately constant regardless of which contact points 111 on the adjustment array 107 and the bracket 108 are in contact. For example, when the header 1 or cutter bar 3 are set to the minimum cut height, the floatation mechanism 100 has the same stretch length as it does when the cutter bar 3 is set to the maximum cut height.

In some embodiments, the end of the floatation mechanism 100 opposite the end which is mechanically linked to the adjustment array 107 is mechanically linked to an apron 112. In some embodiments, the apron 112 is pivotally connected to the trail frame 2. In some embodiments, the header floatation system 10 can include a spring tension mount 110 which is mechanically linked to the end of the floatation mechanism 100 opposite the end which is mechanically linked to the adjustment array 107. In some embodiments, the spring tension mount 110 may be an eccentric mount. In some embodiments, the eccentric mount may be a mount that may adjust tension in the floatation mechanism by being rotated.

Figure 6B:
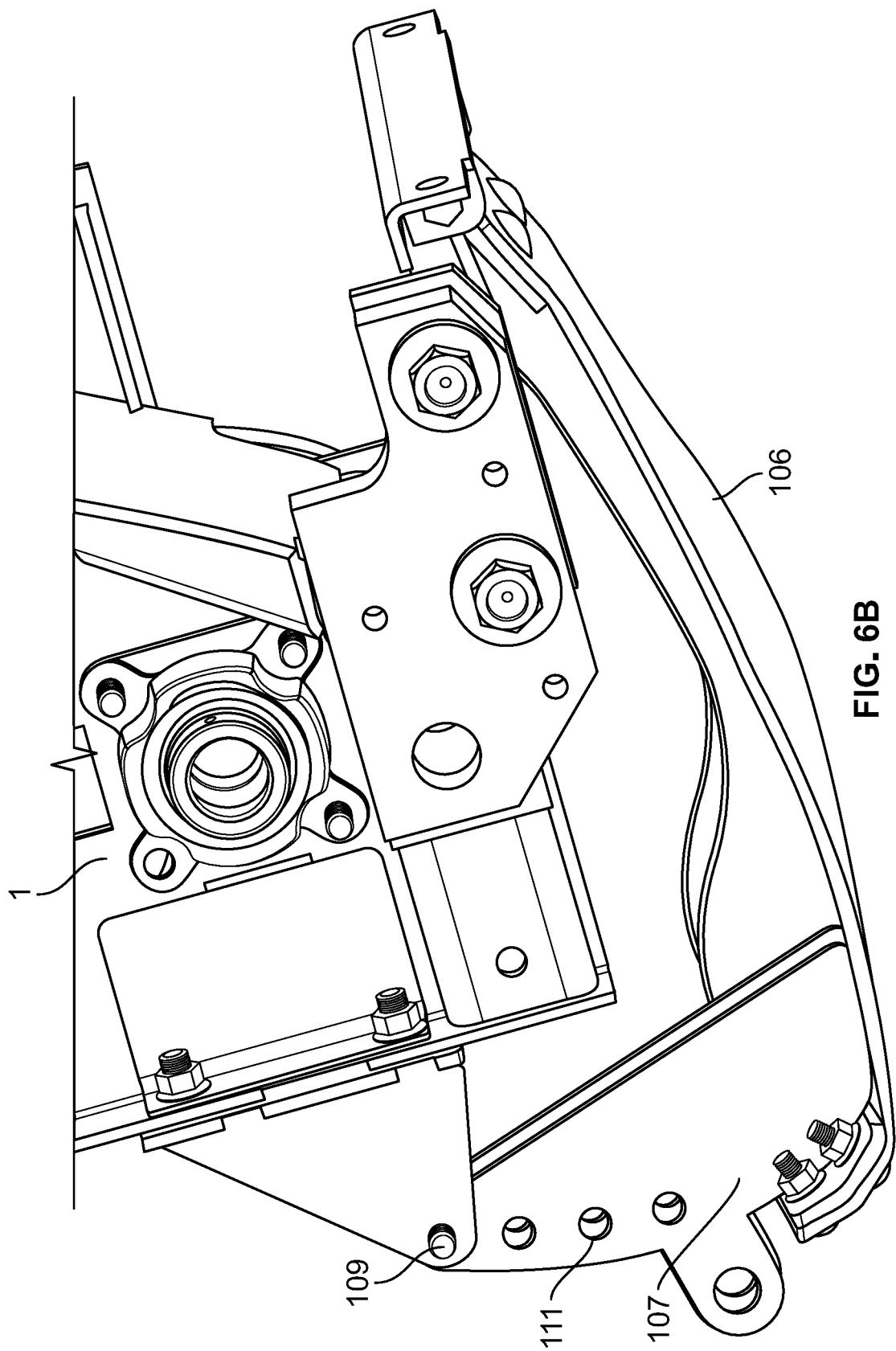
FIG. 6B is a side view of an exemplary adjustable skid shoe mechanically linked to an attached exemplary floatation mechanism while the header is set to a maximum cut height.
Figure 6C:
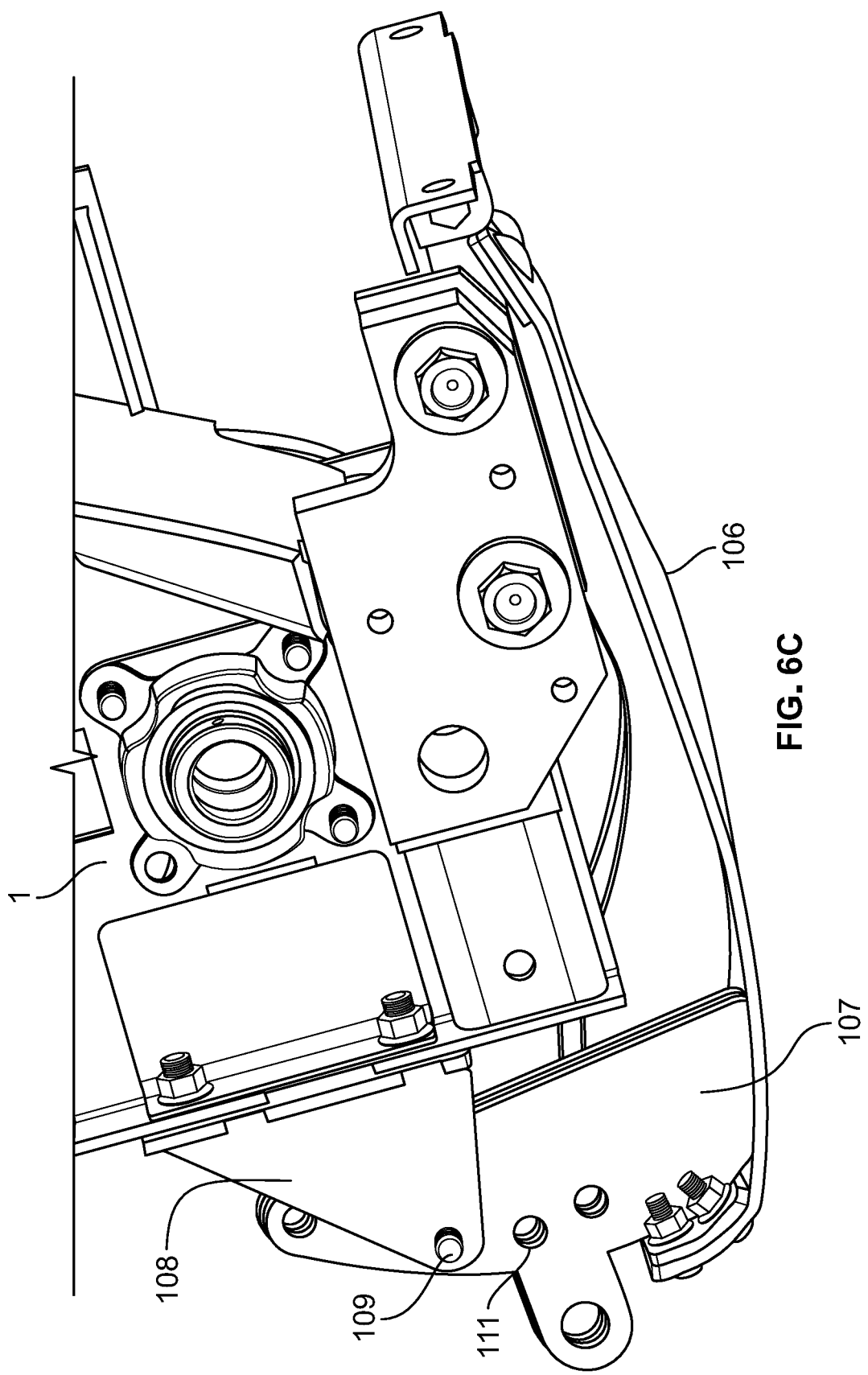
FIG. 6C is a side view of an exemplary adjustable skid shoe mechanically linked to an attached exemplary floatation mechanism while the header is set to an intermediate cut height.

FIG. 6A, FIG. 6B, and FIG. 6C show side views of the skid shoe 106 and the adjustment array 107 while the header 1 and cutter bar 3 are positioned to the minimum, the maximum, and an intermediate height, respectively.

What is claimed is:

1. A header floatation system, comprising:
    a header comprising a cutter bar positioned generally at the underside of the header;
    a floatation mechanism comprising a first end and a second end opposite to the first end;
    an adjustment array comprising at least a first contact point;
    a bracket comprising at least a second contact point;
    a fastener; and
    a skid shoe;
        wherein at least the first end of the floatation mechanism is mechanically linked to the adjustment array;
        wherein either the adjustment array or the bracket comprises a third contact point;
        wherein the adjustment array is operably and mechanically linked to the skid shoe; and
        wherein the fastener is positioned adjacent to, on, or through at least the first and/or second contact point, thereby aligning contact between the bracket and the adjustment array and defining at least one cut height.

2. The header floatation system of claim 1,
    wherein the adjustment array comprises a plurality of contact points;
    wherein the contact points are holes;
    wherein the contact points are arranged in a path;
        wherein each contact point along the path defines a distinct cut height and a distinct operable mode.

3. The header floatation system of claim 1, further comprising a trail frame and an apron positioned substantially horizontally across the top of the trail frame;
    wherein the floatation mechanism comprises:
        a spring positioned vertically or substantially vertically from the adjustment array to the apron and defining a cylindrical space; and
        a bar positioned vertically or substantially vertically from the adjustment array to the apron and sharing or substantially sharing an axis with the cylindrical space defined by the spring;
    wherein the spring is adjustable in position and creating tension upon the bar by attachment to the bar.

4. The header floatation system of claim 1,
    wherein the header floatation system is adjustable in cut height in at least a first and a second operable mode;
    wherein in the first operable mode, the adjustment array and the bracket are positionally aligned by the fastener operably linking the adjustment array and the bracket at the first contact point; and
    wherein in the second operable mode, the adjustment array and the bracket are positionally aligned by the fastener operably linking the adjustment array and the bracket at the third contact point.

5. The header floatation system of claim 1, further comprising a third operable mode;
    wherein the third operable mode comprises the header at a height where the floatation mechanism is free or substantially free of tension.

6. The header floatation system of claim 4, wherein the floatation mechanism has a stretch length while the header is positioned in the first operable mode that is substantially equal to the stretch length while the header is positioned in the second operable mode.

7. The header floatation system of claim 1,
    wherein the adjustment array comprises a first array side and a second array side;
    wherein the first array side comprises a first plurality of contact points that are a plurality of holes in a path corresponding to positions that determine a cut height of an operable position of the header floatation system upon alignment with the second contact point on the bracket;
    wherein the second array side comprises a second plurality of contact points that are a plurality of holes;
        wherein each of the holes in the second plurality of contact points is a pair with one of the holes in the first plurality of contact points;
            wherein each pair of contact points has the same vertical placement on the first and the second array sides;
    wherein the bracket comprises a first bracket side and a second bracket side; and
    wherein the adjustment array is positioned between the first and the second bracket side.

8. The header floatation system of claim 1, wherein the floatation mechanism is mechanically linked to the adjustment array at a point at or adjacent to the middle of a leading edge of the adjustment array.

9. The header floatation system of claim 1, wherein the adjustment array comprises from about two to about eight contact points.

10. A mower, comprising:
    a tongue; and
    a header floatation system ;
        wherein the header floatation system comprises:
            a trail frame;

a header comprising a cutter bar generally positioned on the underside of the header;
an adjustment array comprising at least a first contact point;
a bracket mechanically linked to the header and comprising at least a second contact point;
a floatation mechanism mechanically linked to the adjustment array at one end of the floatation mechanism and mechanically linked to the trail frame at an opposite end of the floatation mechanism;
a fastener; and
a skid shoe;
wherein the trail frame and header are mechanically linked by at least one pivot point;
wherein the adjustment array is operably and mechanically linked to the skid shoe;
wherein either the adjustment array or the bracket comprise at least a third contact point; and
wherein the fastener is positioned adjacent to, on, or through at least the first and/or second contact point, thereby aligning contact between the bracket and the adjustment array and defining at least one cut height.

11. The mower of claim 10,
wherein the adjustment array comprises a plurality of contact points;
wherein the contact points are holes; and
wherein the contact points are arranged in a path;
wherein each contact point along the path defines a distinct cut height and a distinct operable mode.

12. The mower of claim 10, further comprising an apron positioned substantially horizontally across the top of the trail frame;
wherein the floatation mechanism comprises:
a spring positioned vertically or substantially vertically from the adjustment array to the apron and defining a cylindrical space; and
a bar positioned vertically or substantially vertically from the adjustment array to the apron and sharing or substantially sharing an axis with the cylindrical space defined by the spring;
wherein the spring is adjustable in position and creating tension upon the bar by attachment to the bar.

13. The mower of claim 10,
wherein the cutter bar is adjustable in cut height in at least a first and a second operable mode;
wherein in the first operable mode, the adjustment array and the bracket are positionally aligned by the fastener operably linking the adjustment array and the bracket at the first contact point; and
wherein in the second operable mode, the adjustment array and the bracket are positionally aligned by the fastener operably linking the adjustment array and the bracket at the third contact point.

14. The mower of claim 10, further comprising a third operable mode;
wherein the third operable mode comprises the cutter bar positioned at a height where the floatation mechanism is free or substantially free of tension.

15. The mower of claim 13, wherein the floatation mechanism has a stretch length while the cutter bar is positioned in the first operable mode that is approximately equal to the stretch length while the cutter bar is positioned in the second operable mode.

16. The mower of claim 10,
wherein the adjustment array comprises a first array side and a second array side;
wherein the first array side comprises a first plurality of contact points that are a plurality of holes in a path corresponding to positions that determine a cut height of an operable position of the cutter bar upon alignment with the second contact point on the bracket;
wherein the second array side comprises a second plurality of contact points that are a plurality of holes in a path;
wherein each of the holes in the second plurality of contact points is a pair with one of the holes in the first plurality of contact points;
wherein each pair of contact points has the same vertical placement on the first and the second array sides;
wherein the bracket comprises a first bracket side and a second bracket side; and
wherein the adjustment array is positioned between the first and the second bracket sides.

17. The mower of claim 10, wherein the skid shoe is mechanically linked to the cutter bar by at least one pivot point.

18. The mower of claim 10, wherein the floatation mechanism is mechanically linked to the adjustment array at a point at or adjacent to the middle of a leading edge of the adjustment array.

19. A method of adjusting a cut height of a header, comprising:
a header floatation system comprising:
a trail frame;
a header comprising a cutter bar generally positioned on the underside of the header;
a skid shoe;
an adjustment array comprising at least a first contact point;
a floatation mechanism mechanically linked to the adjustment array at one end of the floatation mechanism and mechanically linked to the trail frame at an opposite end of the floatation mechanism;
a bracket mechanically linked to the header and comprising at least a second contact point; and
a fastener;
wherein the trail frame and header are mechanically linked by at least one pivot point;
wherein the adjustment array is mechanically linked to the skid shoe;
wherein either the adjustment array or the bracket comprise at least a third contact point; and
wherein the fastener is positioned adjacent to, on, or through at least the first or second contact points aligning contact between the bracket and the adjustment array;
the method comprising moving the position of the fastener from the first contact point to the third contact point along the path of the adjustment array to position the cutter bar to a desired cut height.

20. The method of claim 19, further comprising:
lifting the header to a height sufficient to release all or substantially all of the tension in the spring before moving the fastener from the first contact point to the third contact point.

* * * * *